United States Patent
Prabhakar et al.

(10) Patent No.: US 12,474,985 B2
(45) Date of Patent: Nov. 18, 2025

(54) PREDICTIVE MODEL FOR HANDLING NETWORK CONFIGURATION FAILURES

(71) Applicant: Arista Networks, Inc., Santa Clara, CA (US)

(72) Inventors: Krishna Prabhakar, Los Altos Hills, CA (US); Rajarao Bhagya Prasad Nittur, Milpitas, CA (US); Venkatesh Ramachandran, Bengaluru (IN); Anoop Kumaran Nair, Thrikkakara (IN); Rajesh Kumar Ganapathy Achari, Perumbavoor (IN); Madhusudhan Chitradurga Sethuram Setty, Bengaluru (IN)

(73) Assignee: Arista Networks, Inc., Santa Clara, CA (US)

( * ) Notice: Subject to any disclaimer, the term of this patent is extended or adjusted under 35 U.S.C. 154(b) by 42 days.

(21) Appl. No.: 18/538,937

(22) Filed: Dec. 13, 2023

(65) Prior Publication Data

US 2024/0411652 A1 Dec. 12, 2024

(30) Foreign Application Priority Data

Jun. 12, 2023 (IN) .............................. 202341039926

(51) Int. Cl.
*G06F 11/07* (2006.01)
*G06F 11/22* (2006.01)
(Continued)

(52) U.S. Cl.
CPC ........ *G06F 11/0709* (2013.01); *G06F 11/079* (2013.01); *G06F 11/0793* (2013.01);
(Continued)

(58) Field of Classification Search
CPC ............... G06F 11/0709; G06F 11/079; G06F 11/0793; G06F 11/2257; G06F 16/242; G06F 16/245; G06F 40/295; G06F 40/40; G06N 5/022; H04L 9/0825; H04L 41/0806; H04L 41/0893; H04L 41/0894; H04L 41/0895; H04L 41/145; H04L 41/149; H04L 41/28; H04L 43/0876;
(Continued)

(56) References Cited

U.S. PATENT DOCUMENTS 7,720,674 B2 5/2010 Kaiser et al.
7,730,008 B2 6/2010 Foulger et al.
(Continued)

*Primary Examiner* — Yair Leibovich
(74) *Attorney, Agent, or Firm* — Treyz Law Group; Jason Tsai

(57) ABSTRACT

A method of operating a server is provided that includes providing, with the server, one or more services relating to network access control and management of a network, predicting a network configuration failure associated with the network with a failure prediction model, and generating a network configuration recommendation based on the predicted network configuration failure to avoid the predicted network configuration failure. The failure prediction model can be a machine-learning based network configuration failure prediction model that is trained on past network configuration failure events. Operated in this way, erroneous network configuration issues can be automatically identified and addressed in a timely fashion.

20 Claims, 3 Drawing Sheets

(51) Int. Cl.
| | |
|---|---|
| *G06F 16/242* | (2019.01) |
| *G06F 16/245* | (2019.01) |
| *G06F 40/295* | (2020.01) |
| *G06F 40/40* | (2020.01) |
| *G06N 5/022* | (2023.01) |
| *H04L 9/08* | (2006.01) |
| *H04L 9/40* | (2022.01) |
| *H04L 41/0806* | (2022.01) |
| *H04L 41/0893* | (2022.01) |
| *H04L 41/0894* | (2022.01) |
| *H04L 41/0895* | (2022.01) |
| *H04L 41/14* | (2022.01) |
| *H04L 41/149* | (2022.01) |
| *H04L 41/28* | (2022.01) |
| *H04L 43/0876* | (2022.01) |

(52) U.S. Cl.
CPC ........ *G06F 11/2257* (2013.01); *G06F 16/242* (2019.01); *G06F 16/245* (2019.01); *G06F 40/295* (2020.01); *G06F 40/40* (2020.01); *G06N 5/022* (2013.01); *H04L 9/0825* (2013.01); *H04L 41/0806* (2013.01); *H04L 41/0893* (2013.01); *H04L 41/0894* (2022.05); *H04L 41/0895* (2022.05); *H04L 41/145* (2013.01); *H04L 41/149* (2022.05); *H04L 41/28* (2013.01); *H04L 43/0876* (2013.01); *H04L 63/0823* (2013.01); *H04L 63/083* (2013.01); *H04L 63/0876* (2013.01); *H04L 63/10* (2013.01); *H04L 63/102* (2013.01)

(58) Field of Classification Search
CPC ............... H04L 63/0823; H04L 63/083; H04L 63/0876; H04L 63/10; H04L 63/102; H04L 9/3268; H04L 41/147; H04L 41/16; H04L 41/22; H04L 63/0815; H04L 63/20
USPC ........................................................ 714/47.3
See application file for complete search history.

(56) References Cited

U.S. PATENT DOCUMENTS

| | | | |
|---|---|---|---|
| 8,645,405 | B2 | 2/2014 | Chang et al. |
| 9,084,937 | B2 | 7/2015 | Gadher et al. |
| 9,323,641 | B2 | 4/2016 | Beasley |
| 10,048,996 | B1 | 8/2018 | Bell et al. |
| 10,713,441 | B2 | 7/2020 | Sapugay et al. |
| 10,885,026 | B2 | 1/2021 | Das et al. |
| 11,237,939 | B2 | 2/2022 | Chanda et al. |
| 11,520,992 | B2 | 12/2022 | Sapugay et al. |
| 2016/0373302 | A1* | 12/2016 | Sigoure ............... H04L 41/0856 |
| 2017/0206528 | A1* | 7/2017 | Han ..................... G06Q 20/382 |
| 2019/0261222 | A1* | 8/2019 | Raleigh ................. H04W 28/10 |
| 2024/0036999 | A1* | 2/2024 | Aurongzeb ........... G06F 9/5055 |

* cited by examiner

PREDICTIVE MODEL FOR HANDLING NETWORK CONFIGURATION FAILURES This application claims the benefit of Indian Provisional Patent Application No. 202341039926, filed Jun. 12, 2023, which is hereby incorporated by reference herein in its entirety.

BACKGROUND

A network can include many different types of devices such as cameras, thermostats, smoke detectors, medical or health sensors, lighting fixtures, voice-controlled speakers, printers or other output devices, controllers or other input devices, cars, wearable devices, and/or other network-connected equipment. These devices can be associated with one or more users, can have different network addresses, can be at one or more locations, and/or can have different network-related attributes. It can be challenging to manage a network with many devices all having different network-related attributes.

It is within this context that the embodiments herein arise.

DETAILED DESCRIPTION

A method of operating a network access control and management server is provided. The network access control and management server can be configured to provide one or more services relating to network access control and management of a network, to predict a network configuration failure associated with the network with a failure prediction model, and to generate a network configuration recommendation based on the predicted network configuration failure to proactively avoid or prevent the predicted network configuration failure. The failure prediction model can be a machine-learning based network configuration failure prediction model that is trained on past network configuration failure events. Responsive to predicting a network configuration failure with the failure prediction model, the server can preemptively trigger corrective actions in anticipation of the predicted network configuration failure to minimize network disruptions. Configuring and operating a network and an associated server in this way can be technically advantageous and beneficial to automatically identify and optionally correct erroneous network configuration issues.

Figure 1:
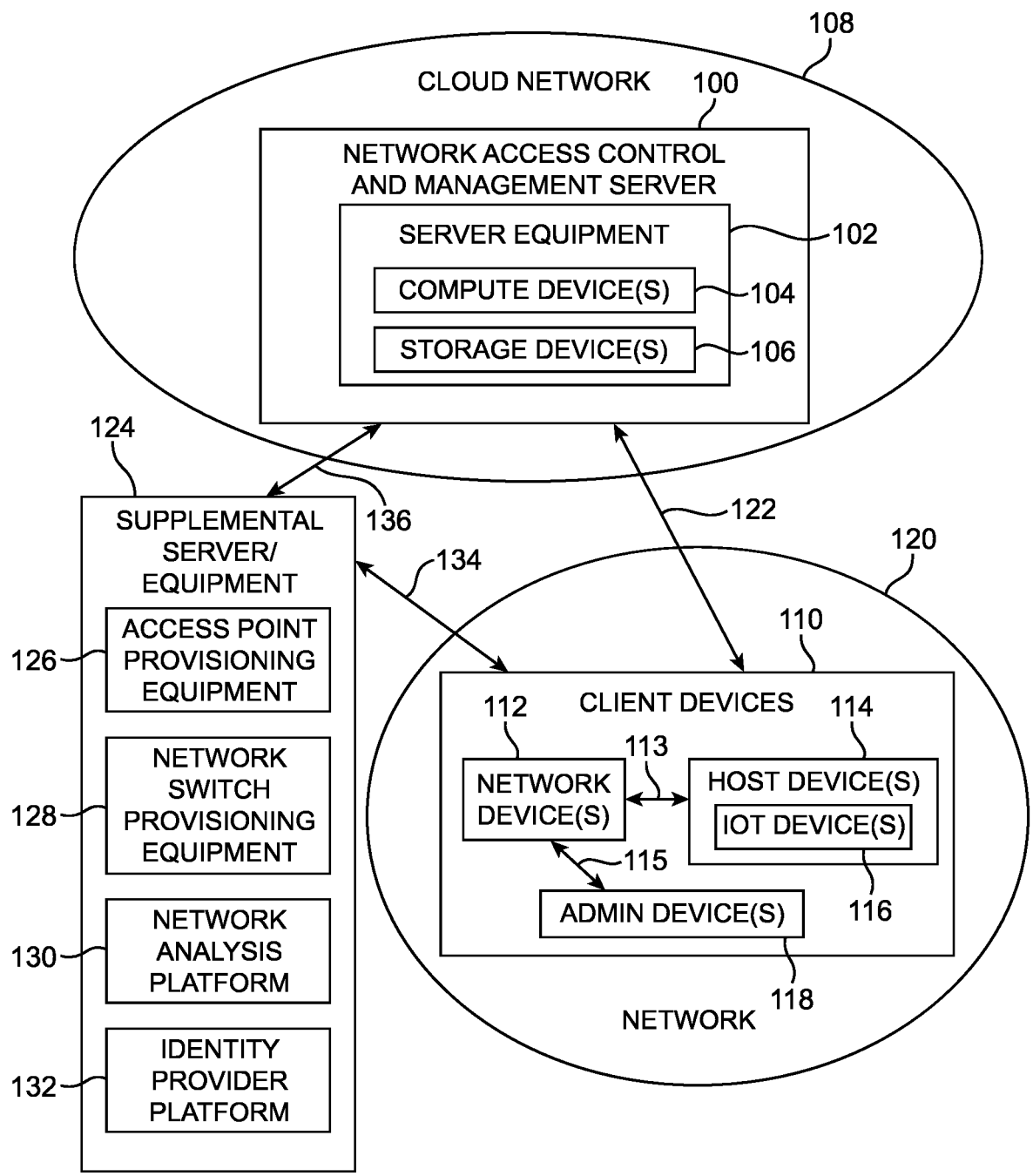
FIG. 1 is a diagram of an illustrative system having a network access control and management server in accordance with some embodiments.

FIG. 1 shows an illustrative networking system that includes a server such as network access control and management server 100. Network access control and management server 100 may be formed from server equipment 102 containing any suitable number of compute devices 104 and any suitable number of storage devices 106.

As an example, server equipment 102 may include server hardware such as blade servers, rack servers, tower servers, micro servers, graphics processing unit (GPU) servers, data storage servers, and enterprise servers. Configurations in which server equipment 102 includes rack servers mounted to racks of a server chassis or enclosure are sometimes described herein as an illustrative example. Each of compute devices 104 and/or storage devices 106 may be provided as part of the server hardware (e.g., as part of rack servers).

Compute devices 104 may include one or more processors or processing units based on central processing units (CPUs), graphics processing units (GPUs), microprocessors, general-purpose processors, host processors, microcontrollers, digital signal processors (DSPs), programmable logic devices such as a field programmable gate array devices (FPGAs), application specific system processors (ASSPs), application specific integrated circuits (ASICs), and/or other types of processors. Storage devices 106 may include non-volatile memory (e.g., flash memory or other electrically-programmable read-only memory configured to form a solid-state drive), volatile memory (e.g., static or dynamic random-access memory), hard disk drive storage, solid-state storage, and/or other storage circuitry. More specifically, storage devices 106 may include non-transitory (tangible) computer readable storage media configured to store the operating system software and/or any other software code, sometimes referred to as program instructions, software, data, instructions, or code. Compute devices 104 may run (e.g., execute) an operating system and/or other software/firmware that is stored on storage devices 106 to perform desired operations of server 100. In such a manner, server equipment 102 may implement one or more services, one or more software servers, and/or other software features to collectively perform the functions of network access control and/or network management for server 100. As described herein, server 100 can refer to the underlying server (hardware) equipment and/or the server software (e.g., services) executed thereon to perform the operations of server 100.

Network access control and management server 100 may be configured to provide network policy reception, definition, monitoring, and enforcement (e.g., reception, definition, and enforcement of network access policy and/or security policy via virtual local area networks (VLANs), access control lists (ACLs), vendor-specific attributes (VSAs), and/or other policy-defining features), natural language query, processing, and response (e.g., a chat interface for outputting network information and network configuration assistance and recommendation based on natural language user input), network-connected device profiling (e.g., the gathering, storage, and analysis of network-connected device information to facilitate network policy recommendations and/or other network configuration recommendations), predictive failure event handling (e.g., prediction and handling of future expected (yet-to-occur) failure events associated with server infrastructure and/or network configuration), network authentication (e.g., authentication for user and/or user device(s) connected to the network), public key infrastructure (PKI) (e.g., includes a certificate authority, a certificate issuance service, a certification validation and/or status lookup service, a certificate database, etc.), interfacing and integration services with external applications and/or servers (e.g., obtain network and/or user information from and distribute network and/or user information to external equipment), and device and/or user onboarding (e.g., registration and storage of user and/or user device information), as just a few examples. In general, server 100 may perform any suitable functions for network access control and management.

A "network access policy" (sometimes referred to as network access control policy) can refer to and be defined herein as a set of rules and guidelines that dictate how client devices can connect to and interact with one another in a computer network. Network access policies lay out the permissions, restrictions, and protocols governing network access and usage to ensure security, integrity, and availability of computing resources. For example, network access policies can include policies relating to how devices must authenticate their identities to gain access to the network, access control lists or ACLs (e.g., lists of rules indicating which files, folders, or resources are accessible to specific users or groups), network segmentation to ensure isolation from different network segments to help increase the overall security, encryption requirements, firewall rules, remote access requirements, policies that govern the types of devices allowed to connect to a certain part of the network, guidelines for keeping the devices up to date with the latest security patches or updates, policies for monitoring network activities and events for potential breaches, and/or other rules and policies.

A "network segment" can refer to a portion of a computer network that is logically or physically separated from other parts of the network. Physical segmentation can be implemented using separate dedicated hardware for each network segment. Logical segmentation can be implemented using virtual local area networks (VLANs), which allow different devices to be grouped together virtually regardless of their physical location. Subnetting, which divides an IP address range into smaller sub-ranges and allows devices within the same subnet to communicate directly with each other without a router, can also be used to implement network segmentation. Network segmentation can be employed to improve network performance, security, isolation of critical assets, compliance, and manageability by organizing a large and often complex network into smaller, more manageable segments. Each network segment can operate independently to some extent with its own set of rules and policies governing access and communication. Thus, a network segment can be defined herein as a group of client devices that are or should be assigned the same or similar network access policy.

Network access control and management server 100 can be configured to provide network access policy setting and enforcement capabilities. For example, server 100 may automatically derive/generate network access policies, to monitor client devices within one or more network segments to determine whether the client devices are violating the network access policies, to ensure that the client devices are abiding by the auto-generated network access policies, etc. In some embodiments, server 100 can be operated in an enforcement mode during which the network access policies are strictly enforced by the network such that the client devices within the network are restricted from violating any established network access policies.

Server 100 may be implemented as a part of a cloud network such as cloud network 108. Cloud network 108 may include one or more network devices such as switches (e.g., multi-layer switches), routers, gateways, bridges, hubs, repeaters, firewalls, wireless access points, devices serving other networking functions, devices that includes a combination of these functions, or other types of network devices. Multiple such network devices (e.g., network devices of different types or having different functions) may be present in cloud network 108 and interconnected therebetween and with other network devices to form a cloud network that forwards traffic to and from portions (e.g., different parts of server equipment 102) of server 100 serving as end hosts of cloud network 108. Configurations in which server 100 is implemented on public cloud infrastructure (e.g., cloud network 108 is a public cloud network) are sometimes described herein as an illustrative example. If desired, server 100 may be implemented on a private cloud network or an on-premise network.

Network access control and management server 100 may communicate with client devices 110 such as one or more network device(s) 112, one or more host device(s) 114, and network administrator devices 118, which are used to configure and administer other network devices. Host devices 114 can include Internet-of-Things (IoT) devices 116 such as network-connected appliances or device such as network-connected cameras, thermostats, smoke detectors, medical or health sensors which are sometimes referred to as Internet-of-Medical-Things (IOMT) devices, or other sensors, lighting fixtures, voice-controlled speakers, printers, or other output devices, controllers or other input devices, cars, wearable devices, and other network-connected equipment that serve as input-output devices and/or computing devices in the distributed networking system. In some illustrative arrangements described herein as an illustrative example, communication between server 100 and at least some host devices 114 (e.g., IoT devices 116) may occur via network devices 112 and links 113 (e.g., network devices 112 may forward network traffic between server 100 and host devices 114 to facilitate communication therebetween). Client devices 110 may form part of network 120 for which server 100 provides the above-mentioned functions (e.g., network access control and management functions containing any combination of network policy handling, natural language query handling, network-connected device profiling, predictive failure event handling, network authentication, public key infrastructure (PKI) services, interfacing and integration services with external applications and/or servers, device and/or user onboarding, etc.).

Host devices 114 may serve as end hosts of network 120 connected to each other and/or connected to other end hosts of other networks (e.g., server 100 of cloud network 108) via network devices 112 using communication paths 113. User devices such as administrator devices 118 may perform network administration for network devices 112, while other user devices may serve as end host devices 114. Network devices 112 may include switches (e.g., multi-layer switches), routers, gateways, bridges, hubs, repeaters, firewalls, access points, modems, load balancers, devices serving other networking functions, devices that include a combination of these functions, or other types of network devices.

Network access control and management server 100 may provide network access control and network management services for network 120 by communicating with network devices 112 and/or host devices 114 via communication paths 122. To facilitate network access control and network management, server 100 may communicate with other supplement servers and/or equipment 124. These supplemental servers 124 may include network management and network device management equipment such as wireless access point provisioning (and/or management) equipment 126 (e.g., a wireless access point management server), network switch provisioning (and/or management) equipment 128 (e.g., a network switch management server), and/or other network device management equipment that communicate with network devices 112 (e.g., to supply provisioning and/or configuration data, to receive network performance metrics data, and/or to exchange other suitable information).

Supplemental servers and equipment 124 may include one or more network analysis platforms 130 such as servers and/or services that provide analysis of network performance by way of providing endpoint visibility and security analysis (e.g., based on network traffic to and/or from host devices 114). Supplemental servers and equipment 124 may further include platforms that provide additional contextual information for the network, the users on the network, and/or the devices on the network such as identity provider platform 132 (e.g., servers and/or services that provide user identity authentication, a single sign-on (SSO) provider platform). In particular, supplemental server and/or equipment 124 may communicate with components of network 120 (e.g., network devices 112 and host devices 114) to supply provisioning, configuration, and/or control data, to receive network, device, and/or user information, and/or to otherwise exchange information therebetween via communications paths 134. Supplemental server and/or equipment 124 may communicate with server 100 (e.g., different portions of server equipment 102) to transmit the received network, device, and/or user information, to receive network access control and/or management information, and/or to otherwise exchange information therebetween via communications paths 136.

Configurations in which equipment 126 and 128 and other network device management equipment refer to server equipment (e.g., similar to server equipment 102) on which network device provisioning and/or management software are executed are sometimes referred to herein as an illustrative example. Similarly, configurations in which network analysis platform 130 and identify provider platform 132 are cloud-based platforms (e.g., applications executed on server equipment) are sometimes described herein as an illustrative example. In these examples, servers and/or equipment 124 may be implemented within the same cloud network as or different cloud networks than server 100. If desired, any of supplement servers and/or equipment 124 may be implemented locally (e.g., local to network 120) instead of as a cloud application (e.g., implemented on a cloud server) or may be implemented in other desired manners.

The networking system in FIG. 1 (e.g., the combination of cloud network 108, network 120, and equipment 124) may span any suitable scope depending on the implementations of servers 100 and 124. Communication paths 122, 134, and 136 may be implemented according to the scope of the networking system. Configurations in which one or more of communication paths 122, 134, and 136 include the Internet are sometimes described herein as an illustrative example. In particular, any of communications paths 122, 134, and 136 may use Hypertext Transfer Protocol Secure (HTTPS), Remote Authentication Dial-In User Service (RADIUS) with Transport Layer Security (TLS) encryption (e.g., RadSec), Secure Shell (SSH), Internet Protocol Security (IPSec), Secure File Transfer Protocol (SFTP), or other secure protocols for establishing and communicating using the corresponding communications paths.

Figure 2:
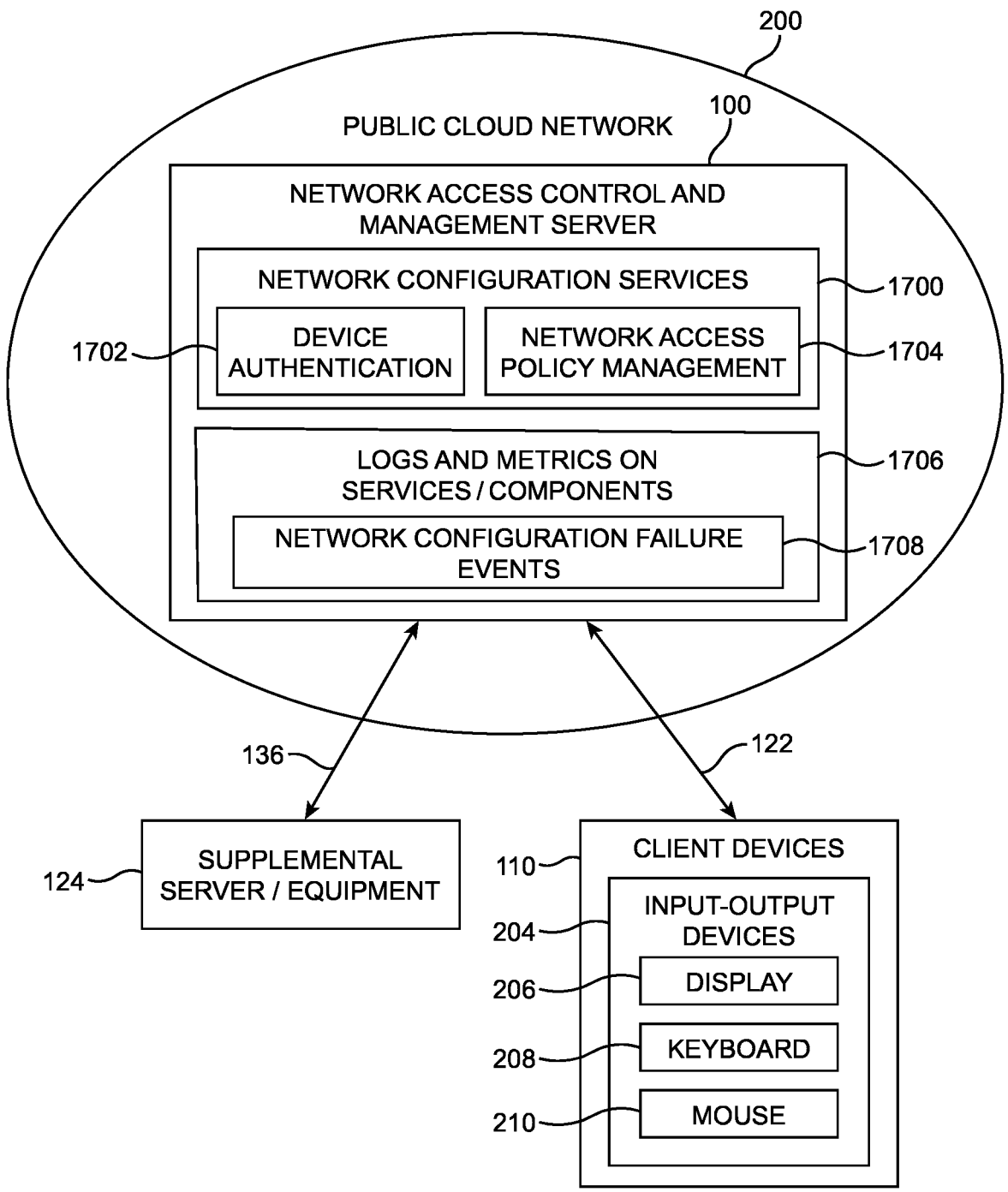
FIG. 2 is a diagram of an illustrative network access control and management server configured to maintain information on service and/or component failure events in accordance with some embodiments.

FIG. 2 is a diagram of an illustrative network access control and management server 100 on which one or more network configuration services are executed and on which network configuration failure information can be maintained. As shown in FIG. 2, network access control and management server 100 may be implemented on public cloud network 200. Server 100 may run a number of services including network configuration services 1700 such as user device authentication service(s) 1702 and network access policy management and enforcement service(s) 1704. Services 1704 may include operations relating to automatically deriving or generating network access policies, to monitoring client devices within one or more network segments to determine whether the client devices are violating the network access policies, to strictly or loosely enforce the network access policies, etc. Each service 1700 may be executed using one or more compute device 104, one or more storage devices 106, and/or other components (e.g., power supply and management devices such as voltage supplies, power management integrated circuits, etc., temperature management devices such as temperature sensors, heat sinks, etc., and other portions of server equipment).

To facilitate the management of the network configuration services 1700, server 100 may obtain and maintain a database 1706 of logs and metrics on the (software) performance of the services and on the hardware components. If desired, the logs and metrics in database 1706 may be obtained from or generally accessible via a server management platform (e.g., that manages the configuration of server equipment such as the number compute and/or storage devices provided for each server). If desired, the logs and metrics in database 1706 may include information on the number and type of client devices 110 connected to server 100 (e.g., to each service) via communications links 122 and the number and type of supplemental server(s) and/or equipment connected to server 100 (e.g., to each service) via communications links 136, may include information on the quality or other characteristics (e.g., bandwidth) of links 122 and 136, and/or may include other operational and performance metrics data. If desired, the logs and metrics in database 1706 may include user records, client device records, and network sessions.

Client device 110 may include input-output devices 204 such as display 206, keyboard 208, mouse 210, as just a few examples. Display 206 may supply a user with output for a user interface (e.g., display a web browser application with a graphical user interface) and the user may interact with the user interface using keyboard 208 and mouse 210 (e.g., supply input for the web browser application via the graphical user interface).

To facilitate the detection of network configuration failure events at the network managed by server 100 (e.g., network 120 to which network devices 112 or generally client devices 110 belong), server 100 may track, in database 1708, the occurrence of any past or present network configuration failure events and the associated context in which the failure event occurred (e.g., as indicated by the log information and/or metrics data such as the number of compute and/or storage devices used for a service shortly prior to failure, temperatures, supply voltages, and/or other operating parameters of the server equipment shortly prior to failure, client devices accessing the service shortly prior to failure, supplemental server(s) connected to the server shortly prior to failure, etc.). A "network configuration failure" may refer to or be defined herein as any failure that can be caused by an error or misconfiguration in the settings of a network device, protocol, or services associated with the network that would prevent proper functionality of that network. For example, a network configuration failure or error can lead to network connectivity issues, security vulnerabilities, and overall network instability, just to name a few potential issues. In general, each network configuration failure event identified in database 1506 may be accompanied by and/or associated with the logs and metrics data of the network (e.g., network 120 to which client devices 110 belong) for which the device authentication and/or policy enforcement is performed around the time of failure (e.g., during a time period prior to failure).

Server 100 may apply machine learning or other types of predictive model using the information in databases 1706 and 1708 to perform predictions of future network configuration failures (e.g., to identify contexts or situations in which a failure is likely to occur). In such a manner, server 100 may take corrective action(s) prior to or in anticipation of an expected future network configuration failure.

Figure 3:
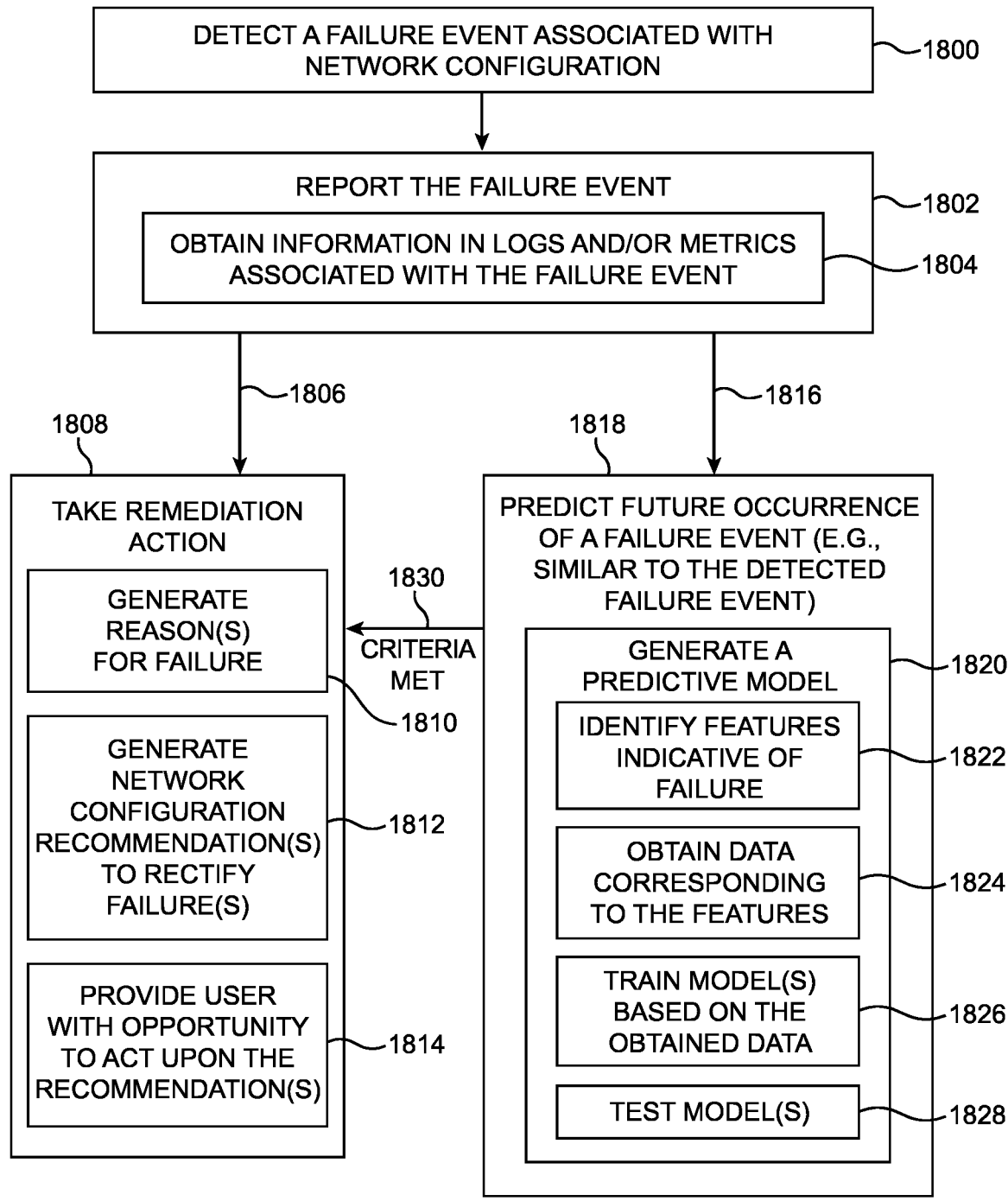
FIG. 3 is a flow chart of illustrative operations for predicting and handling network configuration failures in accordance with some embodiments.

FIG. 3 is a flowchart of illustrative operations for predicting and handling network configuration failure events. As an example, the operations described in connection with FIG. 3 may be performed using network access control and management server 100 of the type described in connection with FIGS. 1 and 2.

During the operations of block 1800, server 100 may detect a failure event associated with the network configuration of network 120 (e.g., by detecting a behavior of the network differing from an expected behavior, by detecting failures or errors in user or device authentication operations, by detecting a violation in a network access policy, by detecting that a network access policy does not capture a desired network segmentation scheme, or by otherwise detecting a need to modify or change the existing network access policy, etc.).

At block 1802, server 100 may report the failure event (e.g., to a network administrator device such as device 118 in FIG. 1 and/or internally for recordation at database 1708). Accordingly, to populate a failure event entry in database 1708, server 100 may obtain information in a logs and/or metrics database (e.g., database 1706) to associate with the failure event. The obtained information may include a number of compute devices in use when the failure occurred, a number of storage devices in use when the failure occurred, a supply voltage, temperature, or other characteristic of server equipment when the failure occurred, a software version of the service running when the failure occurred, and/or any other suitable information that could be indicative of a causation or reason of the failure.

In response to the detected and subsequently reported failure, server 100 may proceed (via path 1806) to take one or more remediation actions at block 1808. As examples, server 100 may be configured to generate one or more reasons for the detected failure event (see operations of block 1810), to generate one or more network reconfiguration recommendations for rectifying the detected failure event (see operations of block 1812), and/or to provide the user with an opportunity to select from among the provided recommendations (see operations of block 1814). The recommendations can, for example, include a recommendation to update the network access policy, a recommendation to update a tag or identifier of one or more host devices that is attempting to perform device authentication with the network, a recommendation to update or import identity information of a user/client device, etc.). If the user or administrator follows the provided recommendation, server 100 can apply the corresponding network configuration that would rectify the detected failure without further user input. If the user does not select a remedial action, server 100 may not perform any corrective measures to rectify the detected failure. In other embodiments, server 100 may automatically perform a corrective measure that is most likely to rectify the detected failure even when the user does not select a remedial action.

In accordance with some embodiments, it may be beneficial to preemptively perform corrective actions in anticipation of a network configuration failure event instead of taking remediation actions in response to a network configuration failure event that has already occurred, potentially disrupting network service. Accordingly, the reporting of the failure event and the corresponding logs and metrics information at block 1802 can be leveraged to help anticipate or predict future network configuration failure events. As shown in FIG. 3, after processing block 1802, server 100 may proceed (via path 1816) to perform operations to predict one or more future occurrences of network configuration failure events (e.g., events similar to a previously detected event) at block 1818. As part of performing the prediction operations of block 1818, server 100 may generate a predictive model at block 1820 by performing the operations of blocks 1822, 1824, 1826, and 1828. Such a predictive model for anticipating future occurrences of network configuration failure(s) can sometimes be referred to and defined herein as a "network configuration failure prediction model."

During the operations of block 1822, server 100 may identify one or more features indicative of a network configuration failure. In particular, server 100 may determine, based on the information obtained at block 1804 after detection and reporting of multiple instances of network configuration failure events, that one or more predictive features (indicators) are most likely to cause future network configuration failure events. As examples, the predictive features may include a software version of the devices in the network, a number of client devices connected to the network, types of client devices connected to the network, a number of supplemental servers connected to the network, types of supplemental servers connected to the network, a number of compute devices, a number of storage devices, a version of the operating system or firmware for the compute and/or storage devices in the network, a supply voltage, temperature, or other operating characteristic of the network equipment, and/or any other suitable predictive information.

During the operations of block 1824, server 100 may obtain data corresponding to the one or more identified features. The obtained data may be used to characterize how likely a failure is to occur (e.g., whether or not a failure will occur) at each data point of the features.

During the operations of block 1826, server 100 may train one or more models (e.g., one or more network configuration failure prediction models) based on the data obtained from block 1824. As an example, server 100 may train a machine learning (ML) model to recognize a pattern of the obtained data (for the combination of features) as a predictor of a failure event. Such a machine-learning based predictive model can be used to predict or estimate a timing of the failure event, a probability of the failure event, and/or of a confidence level of the prediction.

During the operations of block 1828, server 100 may optionally test the machine-learning based predictive model(s). As an example, server 100 may provide test data to the trained machine learning model and monitor/analyze the output of the machine learning model to determine an accuracy of the model based on comparison of the output of the machine learning model to the actual observed non-failure or failure (e.g., whether or not a failure occurred when the input parameters are observed).

After a suitable learning and/or testing time period (e.g., after a suitable number of iterations of the operations at blocks 1826 and 1628), server 100 may use the generated predictive model to analyze logs and/or metrics (e.g., at database 1706) in real-time. The learning period can last for days, weeks, or months, depending on the desired confidence level. A longer learning/testing period will generally produce a higher confidence level, albeit at diminishing marginal returns. In other words, processing of the operations in FIG. 3 may start at block 1818. In response to one or more failure detection criteria being met (e.g., if the predictive model determines that the analyzed information is likely to result in a failure event within a certain time period with a confidence level greater than some threshold), server 100 may proceed to path 1830. Server 100 may then take similar actions as described in connection with blocks 1808, 1810, 1812, and 1814. However, these actions may be preventative actions that avoid the occurrence of a future network configuration failure event rather than a remediation action taken after a network configuration failure that has already occurred. Operating server 100 in this way can be technically advantageous and beneficial since erroneous network configuration issues can be automatically identified and addressed without having to open IT (information technology) support tickets for which the response time can sometimes be too slow and the process sometimes too cumbersome.

The recommendations being provided after taking path 1830 can, for example, include a recommendation to update the network access policy, a recommendation to update a tag or identifier of one or more host devices that is attempting to perform device authentication with the network, a recommendation to update or import identity information of a user/client device, etc.). If the user or administrator follows the provided recommendation, server 100 can then apply the corresponding network configuration that would likely avoid or circumvent the upcoming/future failure. If the user does not select a remedial action at block 1814, server 100 may not perform any preventative measures to avoid the upcoming/future failure. In other embodiments, server 100 may automatically perform a preventative measure that is most likely to avoid or circumvent the upcoming/future failure even when the user does not select a remedial action at block 1814.

As an example of another network configuration recommendation, consider a scenario where client or end-user devices are attempting to connect to a network using EAP-TLS (Extensible Authentication Protocol-Transport Layer Security). EAP-TLS is a security protocol that provides mutual authentication of both the client and the authenticating server, ensuring that each party can verify the identity of each other. An EAP-TLS network authentication process can generally include a client device initiating a handshake process with the authenticating server, the server responding with selected cryptographic parameters, the server sending a digital certificate to the client (e.g., a certificate containing the server's public key and other information about the server's identity), the client sending its own digital certificate to the authenticating server if mutual authentication is required, and a key exchange during which both the client the server generate a shared secret key that is used for encrypting further communication. The client's digital certificate is sometimes referred to and defined herein as the "client certificate."

To validate the digital certificate of the client, the authenticating server may check the client certificate against a trusted certificates list to confirm whether the client's certificate is indeed issued by a trusted certificate authority. A "trusted certificates list" can refer to and be defined herein as a list or collection of digital certificates that are considered valid and trustworthy to a particular entity. Digital certificates can be issued by one or more certificate authorities, which are trusted entities responsible for verifying or vouching for the authenticity of the information in a certificate. In scenarios where the client certificate is not on such a trusted certificates list, the EAP-TLS authentication request can fail. In response to the network authentication failure, server 100 may generate a recommendation to the network administrator to add the extracted client certificate to the trusted certificates list and/or to inspect the authenticating client to determine why the client is using a certificate that is not in the trusted certificates list. The admin can, after determining the reason(s) why the client is using such an unauthorized certificate, decide to proceed with authenticating the client or reject the client from the network.

As an example of another network configuration recommendation, consider a scenario where an authentication server is receiving, from various client devices, a number of authentication requests for which there is no corresponding network definition in the server. In such scenarios, server 100 can recommend to the network administrator to create a proper network configuration for those requests and/or to inspect the clients (e.g., devices such as smartphones, laptops, or other end-user devices that are attempting to connect to the network) or access devices (e.g., network switches, routers, access points, etc.) to determine reason(s) why such authentication requests are arriving at the server.

As an example of another network configuration recommendation, consider a scenario where client or end-user devices are attempting to connect to a network using a MAC (Media Access Control) authentication process. MAC authentication is a security measure for controlling network access based on the physical address of a client device, sometimes referred to as the client's MAC address. Each client device may have its own unique MAC address, typically assigned by its manufacturer. In a network that employs MAC authentication, the network administrator can configure or maintain a list of allowed MAC addresses at each network access device (e.g., network switches, routers, access points, etc.). The list of allowed MAC addresses is sometimes referred to and defined herein as an "authorized MAC address list." In scenarios where the access devices are repeatedly receiving MAC addresses (sometimes for a considerable duration) appearing to attempt MAC authentication but are failing authentication since these MAC addresses are not part of the authorized MAC addresses list, server 100 may generate a recommendation to the network administrator to inspect the access devices and connect the client devices to check if the clients actually need to be added to the authorized MAC address list.

These examples are illustrative. In general, server 100 can be configured to provide network configuration recommendations in response to different types of network hardware failures (e.g., including hardware malfunctions or damaged cabling), software failures (e.g., including operating system issues or incompatible software issues), network access device configuration errors, link failures due to disruption in the physical layer or wireless interference, routing table issues, network congestion, dropped connections, security incidents, power failures, DNS (domain name system) server issues, ISP (Internet Service Provider) outages, operating conditions that might affect proper functionality of the underlying network hardware, human error due to misconfiguration by network administrators, and/or other types of network failures.

The operations of FIG. 3 are exemplary. In some embodiments, one or more of the described operations may be modified, replaced, or omitted. In some embodiments, one or more of the described operations may be performed in parallel. In some embodiments, additional processes may be added or inserted between the described operations. If desired, the order of certain operations may be reversed or altered and/or the timing of the described operations may be adjusted so that they occur at slightly different times. In some embodiments, the described operations may be distributed in a larger system.

The methods and operations described above in connection with FIGS. 1-3 may be performed by the components of one or more network devices and/or server or other host equipment using software, firmware, and/or hardware (e.g., dedicated circuitry or hardware). Software code for performing these operations may be stored on non-transitory computer-readable storage media (e.g., tangible computer readable storage media) stored on one or more of the components of the network device(s) and/or server or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable-storage media may be executed by processing circuitry on one or more of the components of the network device(s) and/or server or other host equipment (see, e.g., FIG. 1, using server equipment 102 on server 100, supplemental server equipment 124, processing equipment on client device 110, or other processing circuitry on a private or public network, etc.).

The foregoing is merely illustrative and various modifications can be made to the described embodiments. The foregoing embodiments may be implemented individually or in any combination.

What is claimed is:

1. A method of operating a server comprising:
with the server, providing one or more services relating to network access control and management of a network;
with a failure prediction model, predicting a network configuration failure associated with the network by detecting when the network is receiving an authentication request that is not part of a trusted certificates list from a client device; and
generating a network configuration recommendation based on the predicted network configuration failure to avoid the predicted network configuration failure.

2. The method of claim 1, further comprising:
in response to predicting the network configuration failure associated with the network, preemptively performing corrective actions in anticipation of the predicted network configuration failure.

3. The method of claim 1, further comprising:
detecting a network configuration failure that has occurred at the network; and
obtaining information relating to the detected network configuration failure that has occurred at the network.

4. The method of claim 3, further comprising:
generating the failure prediction model based on the information relating to the detected network configuration failure that has occurred at the network.

5. The method of claim 4, wherein generating the failure prediction model comprises identifying one or more features indicative of a network configuration failure.

6. The method of claim 5, wherein generating the failure prediction model further comprises obtaining data relating to the one or more identified features.

7. The method of claim 6, wherein obtaining the data relating to the one or more identified features comprises determining a number of devices currently connected to the network when the detected network configuration failure occurred.

8. The method of claim 6, wherein obtaining the data relating to the one or more identified features comprises determining types of devices currently connected to the network when the detected network configuration failure occurred.

9. The method of claim 6, wherein obtaining the data relating to the one or more identified features comprises determining an operating condition of equipment associated with the network when the detected network configuration failure occurred, and wherein the operating condition comprises one or more of a temperature and a supply voltage of the equipment.

10. The method of claim 6, wherein obtaining the data relating to the one or more identified features comprises determining a version of an operating system, software, or firmware being run one or more devices in the network when the detected network configuration failure occurred.

11. The method of claim 6, wherein generating the failure prediction model further comprises training the failure prediction model based on the obtained data relating to the one or more identified features, and wherein generating the failure prediction model further comprises testing the failure prediction model based on test data.

12. The method of claim 1, further comprising:
in response to predicting the network configuration failure associated with the network, generating one or more reasons for the predicted network configuration failure.

13. The method of claim 1, further comprising:
providing an administrator with an opportunity to follow the network configuration recommendation; and
in response to receiving an input from the administrator to follow the recommendation, reconfiguring the network based on the received input.

14. The method of claim 1, further comprising:
generating a network configuration recommendation to add the certificate to the trusted certificates list.

15. The method of claim 1, further comprising:
detecting that the network is receiving a media access control (MAC) address from a client device, wherein the MAC address from the client device is not part of an authorized MAC address list; and
generating a network configuration recommendation to determine whether the MAC address has to be added to the authorized MAC address list.

16. One or more non-transitory computer-readable storage media storing computer-executable instructions that, when executed by one or more processors associated with a server, cause the one or more processors to:
provide one or more services relating to network access control and management of a network;
predict a network configuration failure of the network by detecting that the network is receiving a media access control (MAC) address that is not part of an authorized list from a client device; and
generate a network configuration recommendation based on the predicted network configuration failure.

17. The one or more non-transitory computer-readable storage media of claim 16, further comprising computer-executable instructions that, when executed by the one or more processors, cause the one or more processors to:
generate a predictive model for predicting network configuration failure of the network.

18. The one or more non-transitory computer-readable storage media of claim 16, further comprising computer-executable instructions that, when executed by the one or more processors, cause the one or more processors to:
   generate one or more possible reasons for causing the network configuration failure of the network; and
   provide an administrator of the network with an opportunity to follow the network configuration recommendation.

19. The one or more non-transitory computer-readable storage media of claim 16, wherein the computer-executable instructions that cause the one or more processors to perform the remedial action comprises computer-executable instructions that cause the one or more processors to:
   generate a network configuration recommendation to determine whether the MAC address has to be added to the authorized MAC address list.

20. A method of operating a server comprising:
   providing one or more services relating to network access control and management of a network;
   detecting a network configuration failure associated with the network;
   gathering information associated with the detected network configuration failure;
   generating a failure prediction model based on the gathered information; and
   with the failure prediction model, predicting an additional network configuration failure associated with the network by detecting when the network is receiving an authentication request for which there is no corresponding network definition in the server from a client device.

* * * * *